(12) United States Patent
Brombach et al.

(10) Patent No.: US 9,199,521 B2
(45) Date of Patent: Dec. 1, 2015

(54) TRAILER THEFT DETECTION AND ALARM

(71) Applicant: FORD GLOBAL TECHNOLOGIES, LLC, Dearborn, MI (US)

(72) Inventors: Ronald Patrick Brombach, Plymouth, MI (US); Douglas George Rosner, Livonia, MI (US); Timothy John Zuraw, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 173 days.

(21) Appl. No.: 13/770,279

(22) Filed: Feb. 19, 2013

(65) Prior Publication Data

US 2014/0236420 A1    Aug. 21, 2014

(51) Int. Cl.
*B60D 1/62*    (2006.01)

(52) U.S. Cl.
CPC ........................ *B60D 1/62* (2013.01)

(58) Field of Classification Search
CPC ........ B60Q 1/305; B60Q 11/00; G08B 21/00; G08B 13/1409; B60R 25/1001; B60R 25/1003; B60R 2025/1016; B60R 25/1018; B60R 2325/30; G01L 11/025; G01L 5/136; B60D 1/62
USPC .................... 340/425.5, 426.1, 431
See application file for complete search history.

(56) References Cited

U.S. PATENT DOCUMENTS

| | | | |
|---|---|---|---|
| 3,872,424 A | 3/1975 | Enabnit | |
| 4,291,302 A | 9/1981 | King et al. | |
| 4,737,763 A * | 4/1988 | DeFino et al. | 340/426.1 |
| 7,403,100 B2 | 7/2008 | Peterson et al. | |
| 7,746,219 B1 * | 6/2010 | Paul | 340/431 |
| 7,777,495 B2 | 8/2010 | Mannerfelt | |
| 8,031,061 B2 * | 10/2011 | Kalous | 340/431 |
| 2007/0057676 A1 | 3/2007 | Bourgeois | |
| 2013/0253814 A1 * | 9/2013 | Wirthlin | 701/124 |

FOREIGN PATENT DOCUMENTS

| | | |
|---|---|---|
| EP | 0527254 A1 | 2/1993 |
| GB | 2176957 A | 1/1987 |
| GB | 2399467 A | 9/2004 |

* cited by examiner

*Primary Examiner* — John Q Nguyen
*Assistant Examiner* — Aaron Smith
(74) *Attorney, Agent, or Firm* — Brooks Kushman P.C.; Frank A. MacKenzie

(57) ABSTRACT

An electronic control unit used in, e.g., a towing vehicle includes a processing device configured to determine an initial electrical load of a trailer system, detect changes in the electrical load, and generate an alarm signal if the electrical load is substantially different from the initial electrical load. A method includes determining an electrical load of a trailer system prior to arming a vehicle alarm system, detecting changes in the electrical load after arming the vehicle alarm system, and triggering the alarm system if the electrical load is substantially different from the electrical load determined prior to arming the vehicle alarm system.

17 Claims, 3 Drawing Sheets

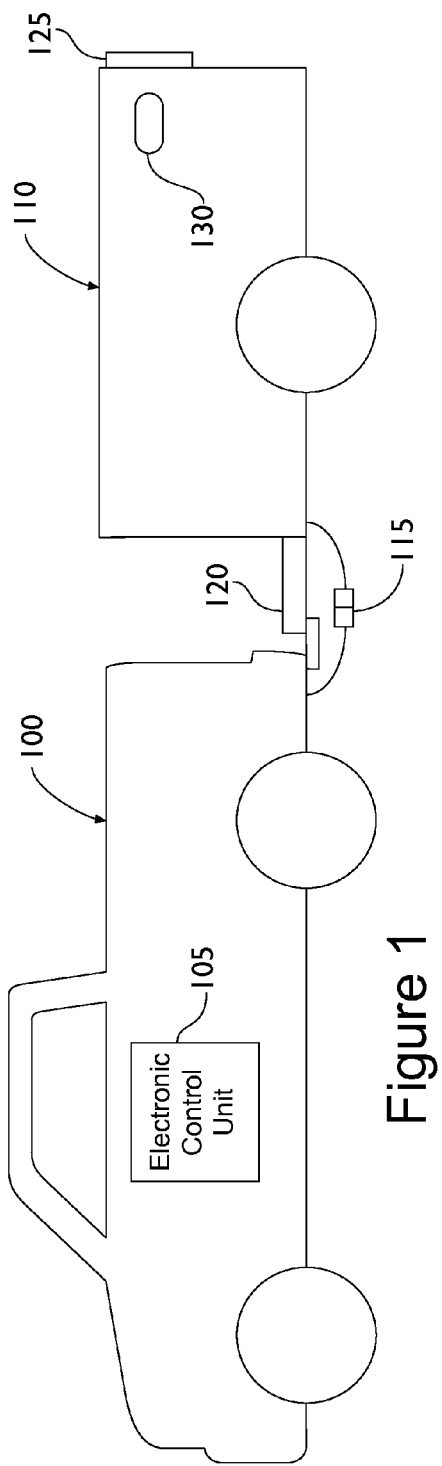
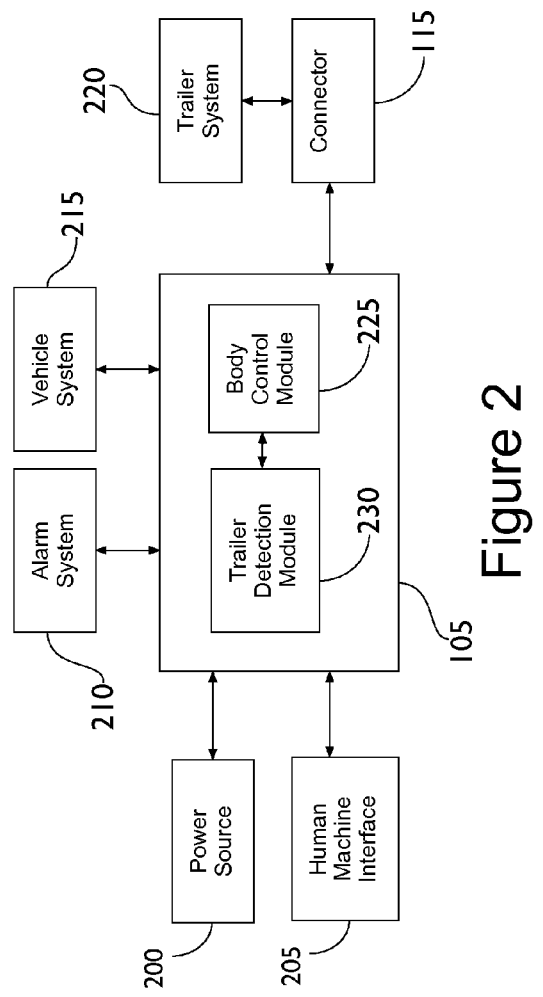

TRAILER THEFT DETECTION AND ALARM

BACKGROUND

Vehicle trailers facilitate the transportation of various goods. In general, a trailer is pulled by a towing vehicle and can be used to temporarily expand the shipping capacity of the towing vehicle. In addition to a hitch that mechanically attaches the trailer to the towing vehicle, some trailers are equipped to receive electrical signals. For example, brake lights and directional indicators of the trailer can be controlled from the towing vehicle through various electrical signals received from the towing vehicle. When the towing vehicle slows, the brake lights on the trailer will illuminate. Likewise, the directional indicators illuminate with the directional indicators of the towing vehicle.

SUMMARY

An exemplary electronic control unit includes a processing device configured to determine an initial electrical load of a trailer system, detect changes in the electrical load, and generate an alarm signal if the electrical load is substantially different from the initial electrical load.

An exemplary method includes determining an electrical load of a trailer system prior to arming a vehicle alarm system, detecting changes in the electrical load after arming the vehicle alarm system, and triggering the alarm system if the electrical load is substantially different from the electrical load determined prior to arming the vehicle alarm system.

A non-transitory computer-readable medium tangibly embodying computer-executable instructions that include determining whether the trailer system is present and attached to a vehicle prior to arming a vehicle alarm system, determining an electrical load of a trailer system prior to arming the vehicle alarm system, and determining at least one of a minimum threshold value and a maximum threshold value based at least in part on the electrical load determined. The instructions further include arming the vehicle alarm system, periodically monitoring the electrical load, and comparing the monitored electrical load to at least one of the minimum threshold value and the maximum threshold value to detect changes in the electrical load after the vehicle alarm system has become armed. The alarm system is triggered if the monitored electrical load is exceeds the maximum threshold value or is below the minimum threshold value.

BRIEF DESCRIPTION OF THE DRAWINGS

FIG. 1 illustrates an exemplary towing vehicle and trailer.

FIG. 2 is a block diagram of exemplary components in the towing vehicle and trailer of FIG. 1.

DETAILED DESCRIPTION

Figure 3:
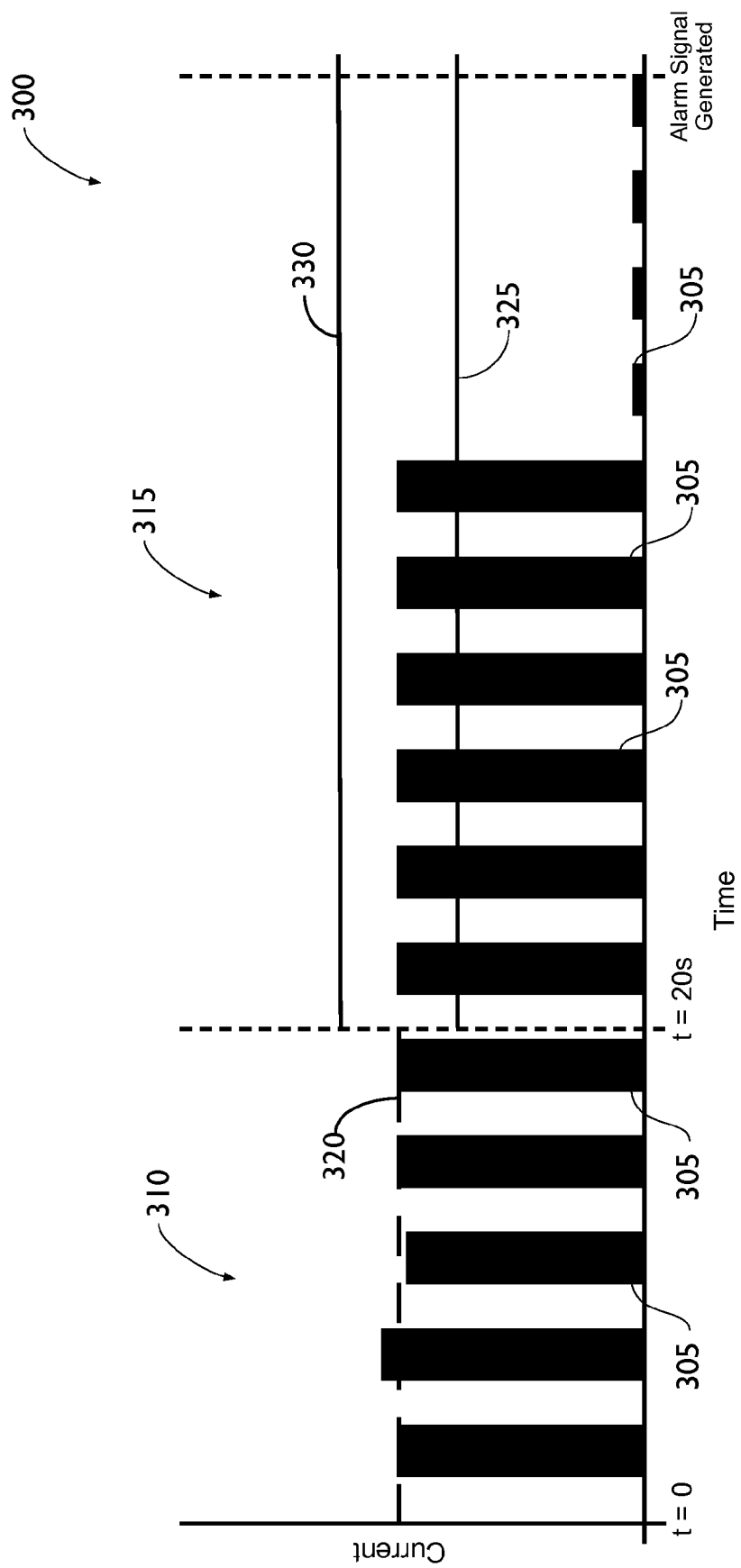
FIG. 3 is a graph of exemplary sample electrical loads measured during a pre-arm phase of an alarm system and exemplary threshold values applied during an armed phase of the alarm system.

An exemplary electronic control unit for a towing vehicle includes a processing device configured to determine an initial electrical load of a trailer system, detect changes in the electrical load, and generate an alarm signal if the electrical load is substantially different from the initial electrical load. The exemplary electronic control unit may be used to detect attempted theft of a trailer. Moreover, the exemplary electronic control unit may include safeguards to detect fake electrical loads as well as account for various environmental conditions that may cause false triggering of the alarm system.

FIG. 1 illustrates an exemplary vehicle and trailer. The system may take many different forms and include multiple and/or alternate components and facilities. The exemplary components illustrated are not intended to be limiting. Indeed, additional or alternative components and/or implementations may be used.

In FIG. 1, a towing vehicle 100, having an electronic control unit 105, is mechanically and electrically connected to a trailer 110.

The towing vehicle 100 may be configured to convert energy into motion for the purpose of transporting goods or passengers. Accordingly, the towing vehicle 100 may include any type of passenger or commercial automobile, such as a car, truck, sport utility vehicle, cross-over vehicle, van, minivan, tractor, tractor-trailer, or the like. Moreover, the towing vehicle 100 may include other types of vehicles such as a motorcycle, locomotive, or railway car. Although not shown in FIG. 1, the towing vehicle 100 may generally include a fuel tank, engine, powertrain system, and wheels. In operation, these and possibly other components facilitate the conversion of energy into motion.

The electronic control unit 105 may include any processing device configured to implement one or more processes associated with the operation of the towing vehicle 100. In general, the electronic control unit 105 may be configured to receive various inputs and generate and output various signals in accordance with the inputs received or computer-executable instructions stored in a memory device (not shown). Moreover, the towing vehicle 100 may include any number of electronic control units 105 configured to control the operation of any number of vehicle systems, some of which are described in greater detail below. Each electronic control unit 105 may include one or more modules configured to implement a particular feature in the towing vehicle 100. As discussed in greater detail below with respect to FIG. 2, the electronic control unit 105 may include a body control module 225 configured to monitor one or more vehicle systems 215 and a trailer detection module 230 configured to detect the presence of the trailer 110. The towing vehicle 100 may include any number of electronic control units 105.

The trailer 110 may include a different vehicle configured to be towed by the towing vehicle 100. In one possible approach, the trailer 110 may mechanically connect to the towing vehicle 100 via a trailer hitch 120 attached to the chassis of the towing vehicle 100. Moreover, an electrical connector 115 may electrically connect the towing vehicle 100 to the trailer 110 to allow the trailer 110 to receive signals from the towing vehicle 100, such as signals that may be generated by the electronic control unit 105. The trailer 110 may include electronic components, some of which may be configured to receive signals via the electrical connector 115. In one possible approach, the trailer 110 may include brake lights 125, directional indicators 130, or both, as well as corresponding electronic circuits or circuit components used to operate the brake lights 125 and directional indicators 130.

FIG. 2 is a block diagram of exemplary components that may be part of the towing vehicle 100 or trailer 110. As shown in FIG. 2, the towing vehicle 100 includes a power source 200, a human machine interface (HMI) 205, an alarm system 210, at least one vehicle system 215, and a trailer system 220 in communication with the electronic control unit 105, which includes a body control module 225 and a trailer detection module 230.

The power source 200 may include any device configured to output energy to one or more components of the towing vehicle 100 or trailer 110. The power source 200 may, in one possible implementation, include a battery configured to convert chemical energy into electrical energy. The electrical energy output by the power source 200 may include direct current (DC) energy. Moreover, the power source 200 may be rechargeable. For purposes of clarity, the power source 200 shown in FIG. 2 provides electrical energy to various components of the towing vehicle 100 and trailer 110 through the electronic control unit 105. The power source 200 may be further configured to provide electrical energy directly to one or more of the other components. Moreover, the towing vehicle 100 or trailer 110 may include any number of power sources 200. Generally, however, the power source 200 is part of the towing vehicle 100.

The human machine interface 205 may include any device configured to present information to and receive inputs from a user, such as a driver or passenger of the vehicle. In one possible approach, the human machine interface 205 may include a touch-sensitive display screen configured to present one or more icons or another indicator of various selectable options. Inputs provided to the human machine interface 205 may be passed to the electronic control unit 105 to control various aspects of the vehicle. For example, inputs provided to the human machine interface 205 may be used by the electronic control unit 105 to enable or disable the alarm system 210, control the climate in the vehicle, interact with a navigation system, control media playback, or the like.

In one possible implementation, the human machine interface 205 may be configured to present a user with a trailer connection menu. The trailer connection menu may include various options for user selection. Example options may include "off," "on," and "auto." The "off" option may cause the alarm system 210 to ignore alarm signals generated by the trailer detection module 230 and possibly other modules of the electronic control unit 105. The alarm system 210 and trailer detection module 230 are each discussed in greater detail below. The "on" option may cause the alarm system 210 to consider alarm signals generated by the trailer detection module 230 of the electronic control unit 105. The "auto" option, discussed in greater detail below, may cause the alarm detection module to enable under certain circumstances, such as when a trailer system 220 with preconfigured parameters is attached to the vehicle.

The alarm system 210 may include any type of device configured to output signals that generate a perceptible warning. The alarm system 210 may be triggered according to various conditions, such as if a thief attempts to steal the towing vehicle 100 or the trailer 110, as discussed in greater detail below. In one possible approach, the alarm system 210 may control a horn (not shown) in the towing vehicle 100 to sound an audible warning. The alarm system 210 may further control lights (not shown) of the towing vehicle 100 to present a visual warning indicator. Another way the alarm system 210 may notify an owner of the towing vehicle 100 is through a telecommunications network. That is, the alarm system 210 may be configured to transmit signals indicating the attempted theft over a cellular network to be received by the owner's mobile device. The alarm system 210 may be configured to communicate with mobile devices through an application installed on the mobile device or via an electronic messaging service such as email, SMS, MMS, or the like. Moreover, the alarm system 210 may be configured to receive signals from the mobile device to, e.g., disable the alarm system 210.

The alarm system 210 may be configured to operate in one or more phases, such as a pre-arm phase and an armed phase. During the pre-arm phase, the alarm system 210 may be configured to determine whether various conditions are met. Examples of the conditions may include that all of the doors and windows of the towing vehicle 100 are closed, that the key has been removed from the ignition, and that the doors are locked. The alarm system 210 may be configured to remain in the pre-arm phase for a predetermined amount of time or until all conditions are met. After the alarm system 210 determines that all conditions have been met, the alarm system 210 may be configured to operate in an armed phase. During the armed phase, the alarm system 210 may wait for an attempted unauthorized intrusion into or theft of the towing vehicle 100 or trailer 110. If detected, the alarm system 210 may proceed to generate the audible and/or visual alarm, and/or send a message to the user's mobile device. In one possible implementation, the alarm system 210 may be configured to trigger the alarm in response to receiving an alarm signal from the trailer detection module 230, as discussed in greater detail below.

The vehicle system 215 may include one or more sensors located throughout the towing vehicle 100, and signals generated by the vehicle system 215 may represent a status of one or more components of the towing vehicle 100. One type of sensor may include a door lock sensor configured to determine whether one or more of the doors of the towing vehicle 100 are closed, locked, or both. If so, the door lock sensor may be configured to output a signal representing that one or more of the doors are locked. Other types of sensors may include a window sensor configured to determine whether a window is closed, a trunk or tailgate sensor configured to determine whether the trunk or tailgate of the towing vehicle 100 is closed, a hood sensor configured to determine whether the hood of the towing vehicle 100 is closed, an ignition sensor configured to determine whether a key is in the ignition of the towing vehicle 100, etc. Signals generated by the vehicle systems 215 may be transmitted to the electronic control unit 105 for processing.

The trailer system 220 may include one or more electronic components located on the trailer 110. In one possible approach, the trailer system 220 may include any combination of the brake lights 125, directional indicators 130, and corresponding electronic components (e.g., circuits) associated with the brake lights 125 and directional indicators 130. One or more components of the trailer system 220 may create an electrical load for the power source 200. The electrical load of the trailer system 220 may be proportional or otherwise related to the amount of power drawn by one or more components of the trailer system 220. Thus, the electrical load may be proportional to the amount of power drawn by any one or more of the brake lights 125, directional indicators 130, or circuit components that make up the trailer system 220.

The body control module 225 may include any processing device configured to monitor and control the operation of various components in the towing vehicle 100. For instance, the body control module 225 may monitor and control operations associated with the windows, mirrors, climate system, door locks, etc. As illustrated, the body control module 225 is included in the electronic control module. In some approaches, the features of the body control module 225 may be performed by the electronic control unit 105 or another module in the towing vehicle 100. In other implementations, the body control module 225 may be implemented in a different processing device than the electronic control module.

The trailer detection module 230 may include any processing device configured to determine whether the trailer 110 is electrically connected to the towing vehicle 100 based on, e.g., the electrical load of the trailer system 220. The trailer detection module 230 may be configured to measure the electrical load of the trailer system 220 at particular times, such as during the pre-arm phase of the alarm system 210, to determine an initial electrical load. If an electrical load has a non-zero value, the trailer detection module 230 may be configured to determine that the trailer 110 is presently electrically connected to the towing vehicle 100. As discussed in greater detail below, the initial electrical load may be converted into a threshold value or a range of threshold values, including a minimum threshold value and a maximum threshold value, that may be used to determine if the trailer 110 is improperly removed from the towing vehicle 100 while the alarm system 210 is in the armed phase. The use of the maximum threshold value may help the trailer detection module 230 potentially thwart attempts to provide a fake load intended to trick the trailer detection module 230 into falsely detecting a trailer system 220 when none is actually present.

To further improve the accuracy of the detection, which may also help to potentially thwart attempts to deceive the trailer detection module 230, the trailer detection module 230 may be configured to periodically sample the electrical load of the trailer system 220 at predetermined intervals during the pre-arm phase. The threshold value or threshold value range may be based on the averages of the sampled electrical loads measured during the pre-arm phase instead of a single measurement of the electrical load.

Moreover, the trailer detection module 230 may be configured to detect changes in the electrical load caused by legitimate factors such as temperature, humidity, moisture, etc., as opposed to an attempted theft. For instance, the trailer detection module 230 may be configured to continue to sample the electrical load during the armed phase and, if necessary, update the threshold value or threshold value range. In one possible implementation, relatively minor changes in the electrical load measured during the armed phase may suggest that the electrical load has been affected by one of the legitimate factors discussed above. To the contrary, a sudden drop in the electrical load may suggest an attempt to steal the trailer 110, even if that sudden drop is remedied relatively quickly, which could suggest a thief is attempting to fake the electrical load.

The trailer detection module 230 may be further configured to monitor various conditions of the towing vehicle 100, trailer 110, or both, to determine whether to trigger the alarm system 210. If the trailer detection module 230 determines that the alarm system 210 should be triggered, such as if the trailer detection module 230 determines that a thief is trying to break into the towing vehicle 100 or steal the trailer 110, the trailer detection module 230 may be configured to generate an alarm signal and transmit the alarm signal to the alarm system 210. Upon detection of an unauthorized intrusion or potential theft, the trailer detection module 230 may generate the alarm signal and transmit the alarm signal to the alarm system 210 so that an audible and/or visual alarm may be generated.

The trailer detection module 230 may receive information about particular components of the towing vehicle 100 and trailer 110 and use the received information to generate the alarm signal. For instance, the trailer detection module 230 may determine from the body control module 225 whether the windows and doors of the towing vehicle 100 are closed. During the armed phase, the trailer detection module 230 may be configured to monitor the electrical load of the trailer system 220 to determine a "present" electrical load. The electrical load may be monitored at periodic intervals, such as every, e.g., 50 ms. The trailer detection module 230 may compare the initial electrical load of the trailer system 220, measured during the pre-arm phase, to the present electrical load, measured every, e.g., 50 ms during the armed phase, and generate the alarm signal if the electrical load is substantially different from the initial electrical load. In some instances, the trailer detection module 230 may be configured to generate and output the alarm signal if the monitored electrical load is substantially different from the initial or sampled electrical load a predetermined amount of times within a particular period of time. For example, the trailer detection module 230 may be configured to generate the alarm signal if the monitored electrical load differs from the initial or sampled electrical load at least four times over, e.g., a 200 ms period.

In some implementations, the trailer detection module 230 may be configured to detect changes in the electrical load during the armed phase only if the trailer detection module 230 determines that the trailer system 220 is present. If so, the trailer detection module 230 may be configured to monitor and detect changes of the electrical load of the trailer system 220. If no trailer 110 is detected, the trailer detection module 230 may be configured to automatically switch to the "off" state, described above.

The trailer detection module 230 may be configured to determine a minimum threshold value, a maximum threshold value, or both, based at least in part on the initial electrical load. The minimum threshold value and the maximum threshold value may be determined such that the initial electrical load is an average of the minimum and maximum threshold values. Alternatively, the trailer detection module 230 may be configured to set the minimum threshold value to the initial electrical load and determine the maximum threshold value to be a predetermined value above the minimum threshold value. In another alternative approach, the trailer detection module 230 may be configured to set the maximum threshold value to the initial electrical load and determine the minimum threshold value to be a predetermined value below the maximum threshold value. The trailer detection module 230 may also be configured to determine a threshold range from the minimum and maximum threshold values. In one possible implementation, the trailer detection module 230 may be configured to determine the threshold values or threshold range from the electrical load sampled during the pre-arm phase.

The trailer detection module 230 may be configured to periodically monitor the electrical load of the trailer system 220 during the armed phase. The trailer detection module 230 may be configured to compare the monitored electrical load to the initial electrical load. That is, the trailer detection module 230 may be configured to compare the monitored electrical load to the minimum threshold value, the maximum threshold value, or both. If the monitored electrical load is substantially different from the initial electrical load, which may occur if the monitored electrical load is below the minimum threshold value or exceeds the maximum threshold value, the trailer detection module 230 may be configured to generate and output the alarm signal to the alarm system 210.

The trailer detection module 230 may be configured to operate in different states based on, e.g., a user selection provided to the human machine interface 205, which may be configured to present the user with a trailer connection menu. When the user selects the "off" option, the trailer detection module 230 may be effectively disabled. If the user selects the "on" option, the trailer detection module 230 may be configured to measure the initial electrical load during the pre-arm phase and monitor the electrical load of the trailer system 220 during the armed phase as discussed previously. When the user selects the "auto" option, the trailer detection module 230 may be configured to determine whether the initial electrical load falls within predetermined system parameters that may be associated with known trailer systems 220. If so, the trailer detection module 230 may be configured to proceed to monitor the electrical load of the trailer system 220 while in the armed phase as if the user had selected the "on" option. If not, the trailer detection module 230 may be configured to ignore the electrical load of the trailer system 220 as if the user had selected the "off" option.

In one possible implementation, the trailer detection module 230 may be configured to sample the electrical load of the trailer system 220 even after generating the alarm signal that triggers the alarm system 210 to confirm whether the alarm system 210 should be triggered. If the trailer detection module 230 confirms that the alarm system 210 should be triggered, the trailer detection module 230 may transmit the alarm system 210 to receive the alarm signal. If the trailer detection module 230 determines that the alarm signal was generated in error, the trailer detection module 230 may be configured to take steps to cancel the alarm signal. Such steps may include instructing the alarm system 210 to ignore the alarm signal or transmitting a signal to the alarm system 210 that cancels the alarm signal.

In some implementations, one or more features of the trailer detection module 230 may be performed by the electronic control unit 105 or another module in the towing vehicle 100. In other implementations, the trailer detection module 230 may be implemented in a different processing device than the electronic control module.

In general, computing systems and/or devices, such as the electronic control unit 105, the human machine interface 205, the alarm system 210, and the vehicle system 215, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

FIG. 3 illustrates a graph 300 of example sample electrical loads 305 that may be measured during the pre-arm phase 310, as well as the threshold range that may be implemented during the armed phase 315. As shown in FIG. 3, the pre-arm phase 310 may begin at t=0 and end at t=20 s. The length of the pre-arm phase is merely exemplary and in some instances may be adjustable. During the pre-arm phase 310, the trailer detection module 230 may confirm with the body control module 225 that various components of the towing vehicle 100 are prepared for the alarm system 210 to be armed. For instance, the trailer detection module 230 may confirm, from information received from the body control module 225, that all doors and windows of the towing vehicle 100 are closed. Throughout the pre-arm phase 310, the trailer detection module 230 may measure or sample the electrical load 305 of the trailer system 220, such as the brake lights 125 of the trailer 110, to establish the baseline for the initial electrical load, represented by the dashed line 320. The electrical load may be sampled every, e.g., 50 ms. Only a few samples are illustrated in FIG. 3 for purposes of clarity. At the end of the pre-arm phase 310, the trailer detection module 230 may determine the threshold range or minimum or maximum threshold values, 325 and 330, respectively, based on the initial or sampled electrical load 305.

After the pre-arm phase 310, the alarm system 210 enters the armed phase 315, shown at t=20 s. During the armed phase 315, the trailer detection module 230 may monitor the electrical load 305 of the trailer system 220. If the monitored electrical load 305 either exceeds the maximum threshold value 330 or falls below the minimum threshold value 325, the trailer detection module 230 may generate and output the alarm signal to the alarm system 210. In some implementations, the trailer detection module 230 may generate and output the alarm signal if the monitored electrical load 305, which may be monitored by the trailer detection module 230 every e.g., 50 ms during the armed phase, is different from the initial electrical load 305, which may be measured or sampled during the pre-arm phase 310. Moreover, as illustrated in FIG. 3, the alarm signal may be generated if the electrical load 305 is determined to be outside the minimum or maximum threshold values 325 and 330, respectively, a predetermined number of times (e.g., four times in the example of FIG. 3). Polling the electrical load 305 at periodic intervals may help preserve battery life relative to instances where the electrical load 305 is monitored continuously.

Figure 4:
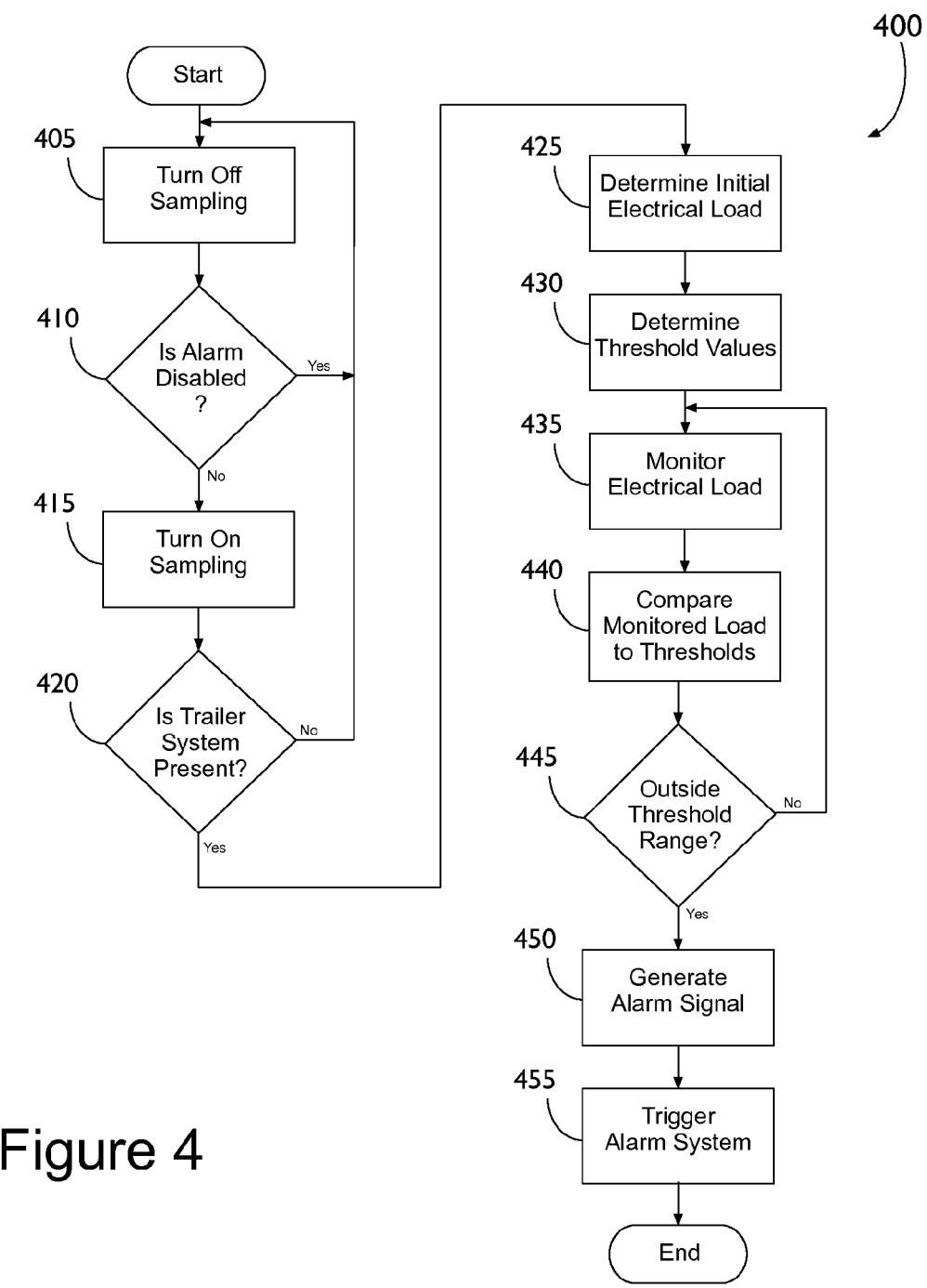
FIG. 4 is a flowchart of an exemplary process that may be implemented by the electronic control unit.

FIG. 4 is a flowchart of an exemplary process 400 that may be implemented by the electronic control unit 105, and in particular, the trailer detection module 230.

At block 405, the trailer detection module 230 may disable sampling of the electrical load of the trailer system 220. For instance, there may be times when it would not be desirable to sample the electrical load, such as when no trailer 110 is detected or if the user has disabled the alarm system 210 via, e.g., the human machine interface 205.

At decision block 410, the trailer detection module 230 may determine whether the alarm system 210 has been disabled. For instance, the trailer detection module 230 may receive an indication provided by the user through the human machine interface 205 to disable the alarm system 210. If so, the process 400 may return to block 405 to turn off sampling of the electrical load. If no input from the user is received at block 410, the process 400 may continue at block 415.

At block 415, the trailer detection module 230 may enable sampling of the electrical load. When enabled, the process 400 may proceed to decision block 420 to determine whether the trailer system 220, and therefore the trailer 100, is present.

At decision block 420, the trailer detection module 230 may determine whether the trailer system 220 is present and attached to the towing vehicle 100. In one exemplary approach, the trailer detection module 230 may detect the presence of the trailer system 220 by attempting to measure the electrical load of the trailer system 220, which as previously discussed may include the electrical load of the brake lights 125 of the trailer 110. The detection of the trailer system 220 may occur prior to arming the alarm system 210 of the towing vehicle 100. If the trailer system 220 is present, the process 400 may continue at block 425. If no trailer system 220 is present, the process 400 may return to block 405 until a trailer system 220 is detected.

At block 425, the trailer detection module 230 may determine an initial electrical load of the trailer system 220. The trailer detection module 230 may be configured to measure the electrical load of the trailer system 220 during the pre-arm phase to determine the initial electrical load. Instead of a single measurement, the trailer detection module 230 may periodically sample the electrical load of the trailer system 220 at predetermined intervals during the pre-arm phase (e.g., prior to arming the alarm system 210) to determine the initial electrical load.

At block 430, the trailer detection module 230 may determine a minimum threshold value, a maximum threshold value, or both, based on the initial or sampled electrical load determined at block 425. The minimum and maximum threshold values may be determined such that the initial or sampled electrical load is the average of the minimum or maximum threshold values. Alternatively, the trailer detection module 230 may set the minimum threshold value to the initial or sampled electrical load and the maximum threshold value as some value above the minimum threshold value. Another possible approach is for the trailer detection module 230 to set the maximum threshold value to the initial or sampled electrical load and the minimum value as some value below the maximum threshold value. Furthermore, the trailer detection module 230 may determine a threshold range from the minimum and maximum threshold values.

At block 435, the trailer detection module 230 may monitor the electrical load of the trailer system 220 after the alarm system 210 is armed. That is, execution of block 435 may take place during the armed phase. During the armed phase, the trailer detection module 230 may periodically sample the electrical load of the trailer system 220 and, if necessary, update the minimum threshold value, the maximum threshold value, or both, based at least in part on the electrical load sampled after the alarm system 210 is armed. As discussed above, factors such as temperature, humidity, moisture, etc., may cause relatively minor changes in the electrical load. The trailer detection module 230 may consider these relatively minor changes to be based on legitimate environmental factors and not theft. Therefore, the threshold values may be updated accordingly.

At block 440, the trailer detection module 230 may detect changes in the electrical load of the trailer system 220 while the alarm system 210 is armed. For instance, the trailer detection module 230 may monitor the electrical load of the trailer system 220 for changes. While relatively minor changes may be caused by environmental factors, as discussed above, large changes in the electrical load may indicate an attempted theft of the trailer 110. Detecting changes in the electrical load may include wherein detecting changes in the electrical load includes monitoring the electrical load and comparing the monitored electrical load to the minimum threshold value, the maximum threshold value, or both.

At decision block 445, the trailer detection module 230 may determine whether the monitored electrical load is outside the threshold range, that is, above the maximum threshold value or below the minimum threshold value. If so, the process 400 may continue at block 450. If not, the process 400 may return to block 435.

At block 450, the trailer detection module 230 may generate the alarm signal since the monitored electrical load is either below the minimum threshold value or exceeds the maximum threshold value. In some instances, prior to transmitting the alarm signal, which may occur at block 455, the trailer detection module 230 may sample the electrical load of the trailer system 220 to confirm that the monitored electrical load is indeed substantially different from the initial electrical load. The process 400 may continue with block 455 if the trailer detection module 230 determines that the sampled electrical load is substantially different from the initial electrical load during a predetermined number of consecutive measurements, such as four consecutive measurements.

At block 455, the trailer detection module 230 may trigger the alarm system 210 by transmitting the alarm signal to the alarm system 210. The alarm system 210, upon receipt of the alarm signal, may generate an audible and/or visual indication of the alarm to alert the owner of the attempted theft of the trailer 110. Moreover or alternative, the alarm system 210 may transmit a message to the owner's mobile device notifying the owner of the attempted theft.

The process 400 may end after block 455.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An electronic control unit comprising:
a processing device configured to:
   determine an electrical load of a trailer system attached to a vehicle and a minimum threshold and a maximum threshold based on the electrical load,
   compare the electrical load to the thresholds, and
   generate an alarm signal if the electrical load is not between the minimum and maximum thresholds.

2. The electronic control unit of claim 1, wherein the processing device is configured to:
   measure the electrical load of the trailer system prior to alarm arming during a pre-arm phase of an alarm system, and
   monitor the electrical load after alarm arming during an armed phase of the alarm system.

3. The electronic control unit of claim 1, wherein the processing device is configured to:
   determine whether the trailer system is present prior to alarm arming during a pre-arm phase of an alarm system, and
   detect changes in the electrical load after alarm arming during an armed phase of the alarm system if the trailer system is present.

4. The electronic control unit of claim 1, wherein the processing device is configured to determine a threshold range from the minimum and maximum thresholds.

5. The electronic control unit of claim 1, wherein the processing device is configured to:
   periodically sample the electrical load of the trailer system at predetermined intervals prior to alarm arming during a pre-arm phase of an alarm system, and
   determine the minimum and maximum thresholds based at least in part on the sampled electrical load.

6. The electronic control unit of claim 1, wherein the processing device is configured to periodically sample the electrical load of the trailer system after alarm arming during an armed phase of the alarm system.

7. The electronic control unit of claim 6, wherein the processing device is configured to update at least one of the minimum threshold and the maximum threshold based at least in part on the electrical load sampled during the armed phase, wherein the minimum threshold and the maximum threshold are updated during the armed phase in response to a detected change in the sampled electrical load being attributed to a legitimate factor.

8. The electronic control unit of claim 1, wherein the processing device is configured to:
   periodically measure an initial electrical load of the trailer system prior to alarm arming during a pre-armed phase of the alarm system, and
   generate the alarm signal if the electrical load of the trailer system is substantially different from the initial electrical load.

9. The electronic control unit of claim 1, wherein the processing device is configured to sample the electrical load of the trailer system after generating the alarm signal.

10. A method comprising:
    determining a first electrical load of a trailer system attached to a vehicle and minimum and maximum thresholds based on the first electrical load prior to arming a vehicle alarm system;
    determining a second electrical load after arming the vehicle alarm system;
    comparing the second electrical load to the thresholds after arming the vehicle alarm system to generate an alarm signal; and
    triggering the vehicle alarm system to generate an alarm signal if the second electrical load is not between the thresholds.

11. The method of claim 10, further comprising monitoring the second electrical load after arming the vehicle alarm system.

12. The method of claim 10, further comprising determining a threshold range from the minimum and maximum thresholds.

13. The method of claim 10, further comprising:
    periodically sampling the first electrical load at predetermined intervals prior to arming the vehicle alarm system, and
    determining the minimum threshold and the maximum threshold based at least in part on the sampled first electrical load.

14. The method of claim 13, further comprising:
    periodically sampling the first electrical load after arming the vehicle alarm system; and
    updating the minimum and maximum thresholds based at least in part on the first electrical load sampled after arming the vehicle alarm system in response to a change in a legitimate factor.

15. The method of claim 14, further comprising sampling the first electrical load of the trailer system after the generating the alarm signal.

16. A non-transitory computer-readable medium tangibly embodying computer-executable instructions comprising:
    determining whether a trailer system is present and attached to a vehicle prior to arming a vehicle alarm system;
    determining an electrical load of the trailer system prior to arming the vehicle alarm system;
    determining a minimum threshold value and a maximum threshold value based at least in part on the electrical load determined;
    arming the vehicle alarm system;
    periodically monitoring the electrical load;

comparing the monitored electrical load to at least one of the minimum threshold value and the maximum threshold value to detect changes in the electrical load after the vehicle alarm system has become armed; and triggering the alarm system if the monitored electrical load exceeds the maximum threshold value or is below the minimum threshold value.

17. The computer-readable medium of claim 16, the instructions further comprising:

periodically sampling the electrical load of the trailer system after arming the vehicle alarm system; and updating at least one of the minimum threshold value and the maximum threshold value based at least in part on the electrical load sampled after arming the vehicle alarm system in response to a change in a legitimate factor including at least one of temperature, humidity and moisture.

\* \* \* \* \*